Dec. 25, 1945.   A. L. L. BAKER   2,391,612
JETTY, WHARF AND LIKE BERTHING PLACE FOR VESSELS
Filed Nov. 15, 1944   9 Sheets-Sheet 1

Inventor
A.L.L.Baker
By Hascock Downing Seebee
Attys.

Dec. 25, 1945.   A. L. L. BAKER   2,391,612
JETTY, WHARF AND LIKE BERTHING PLACE FOR VESSELS
Filed Nov. 15, 1944   9 Sheets-Sheet 2
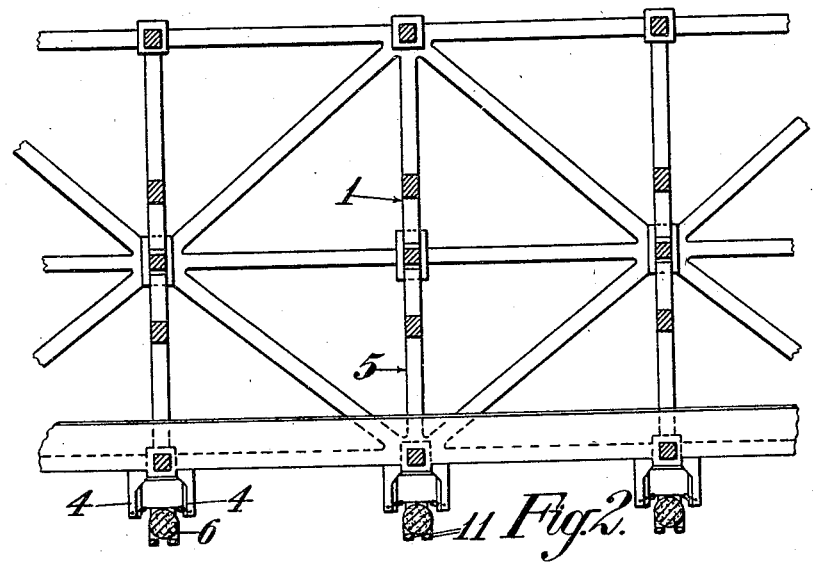
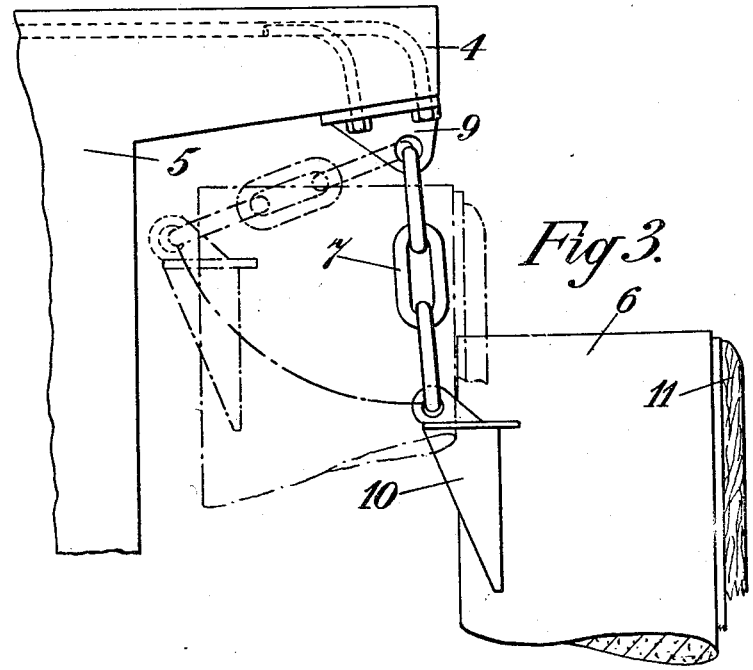
Inventor
A. L. L. Baker Dec. 25, 1945. A. L. L. BAKER 2,391,612
JETTY, WHARF AND LIKE BERTHING PLACE FOR VESSELS
Filed Nov. 15, 1944 9 Sheets-Sheet 3
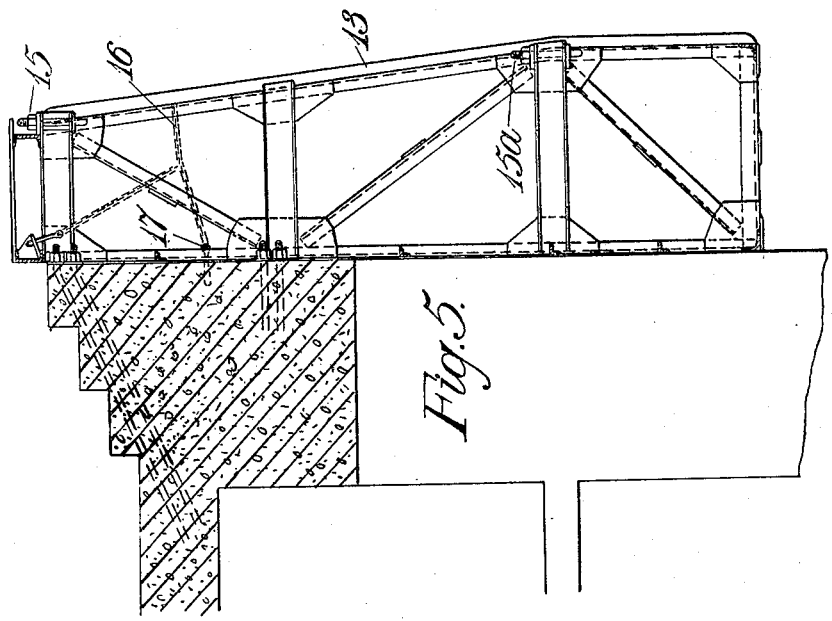
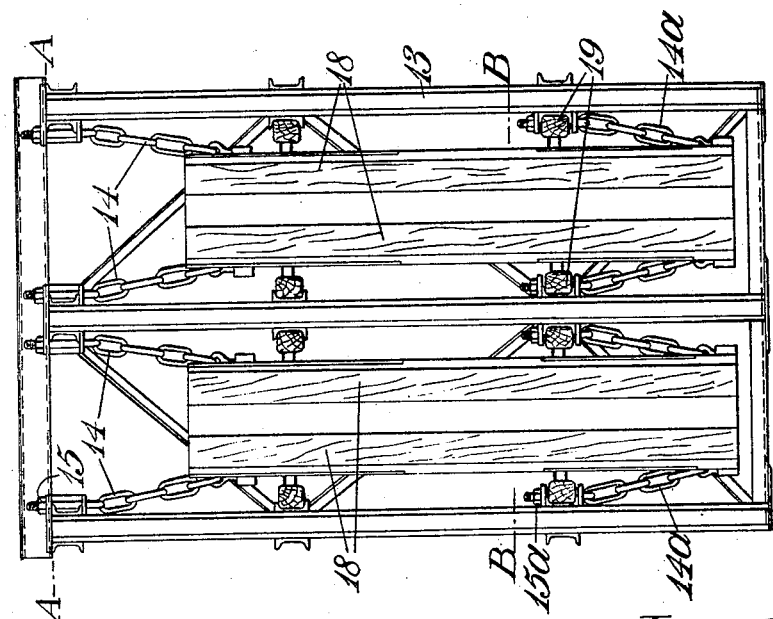

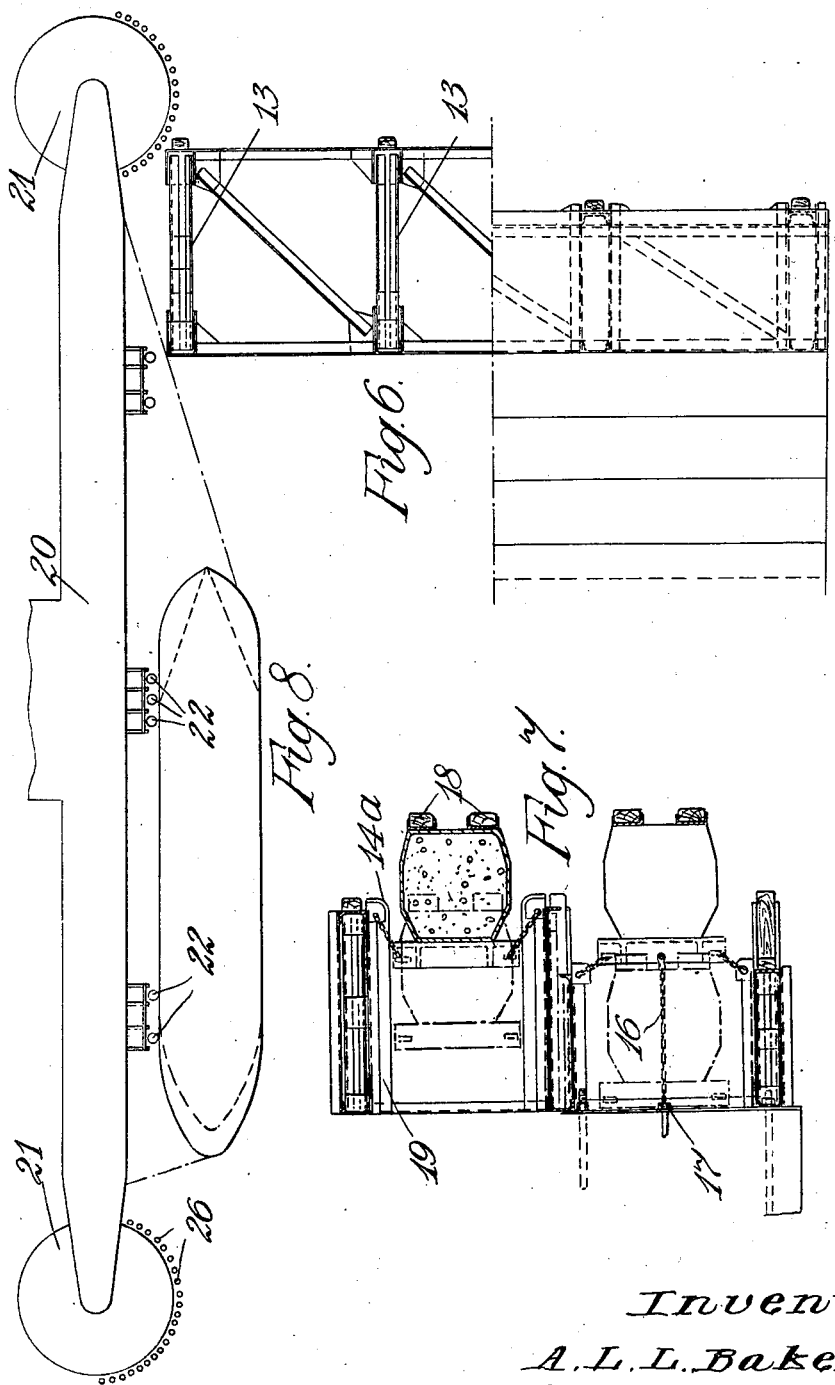

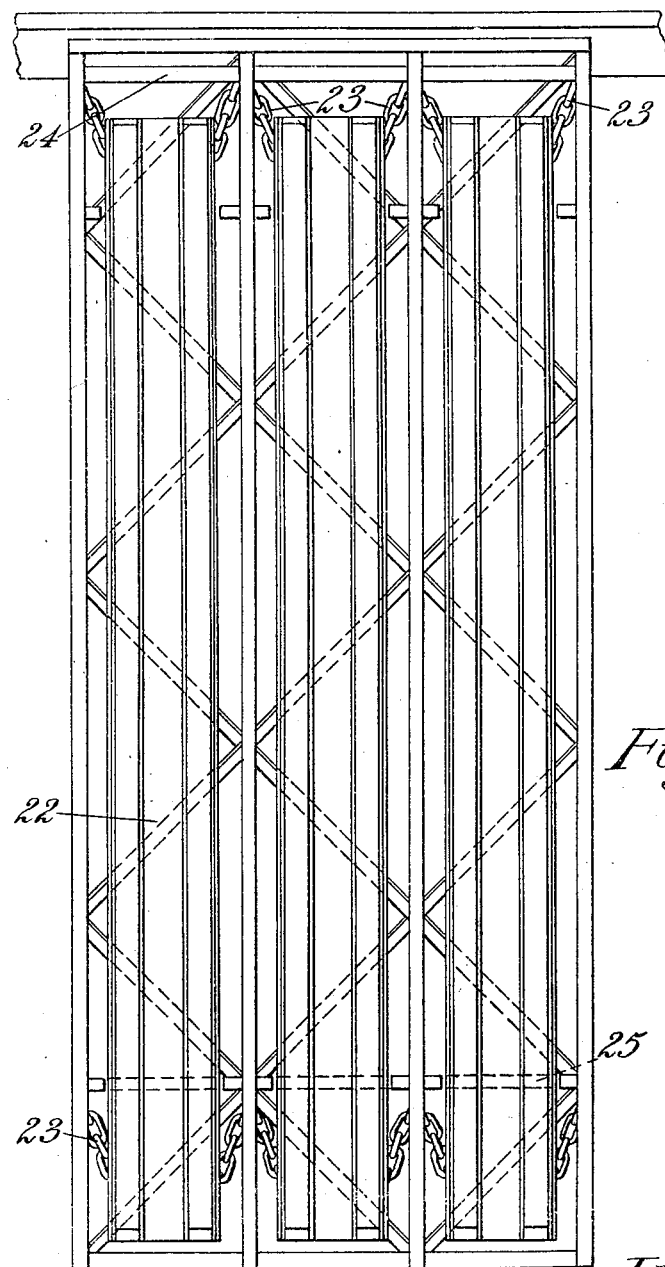

Dec. 25, 1945.  A. L. L. BAKER  2,391,612
JETTY, WHARF AND LIKE BERTHING PLACE FOR VESSELS
Filed Nov. 15, 1944  9 Sheets-Sheet 6
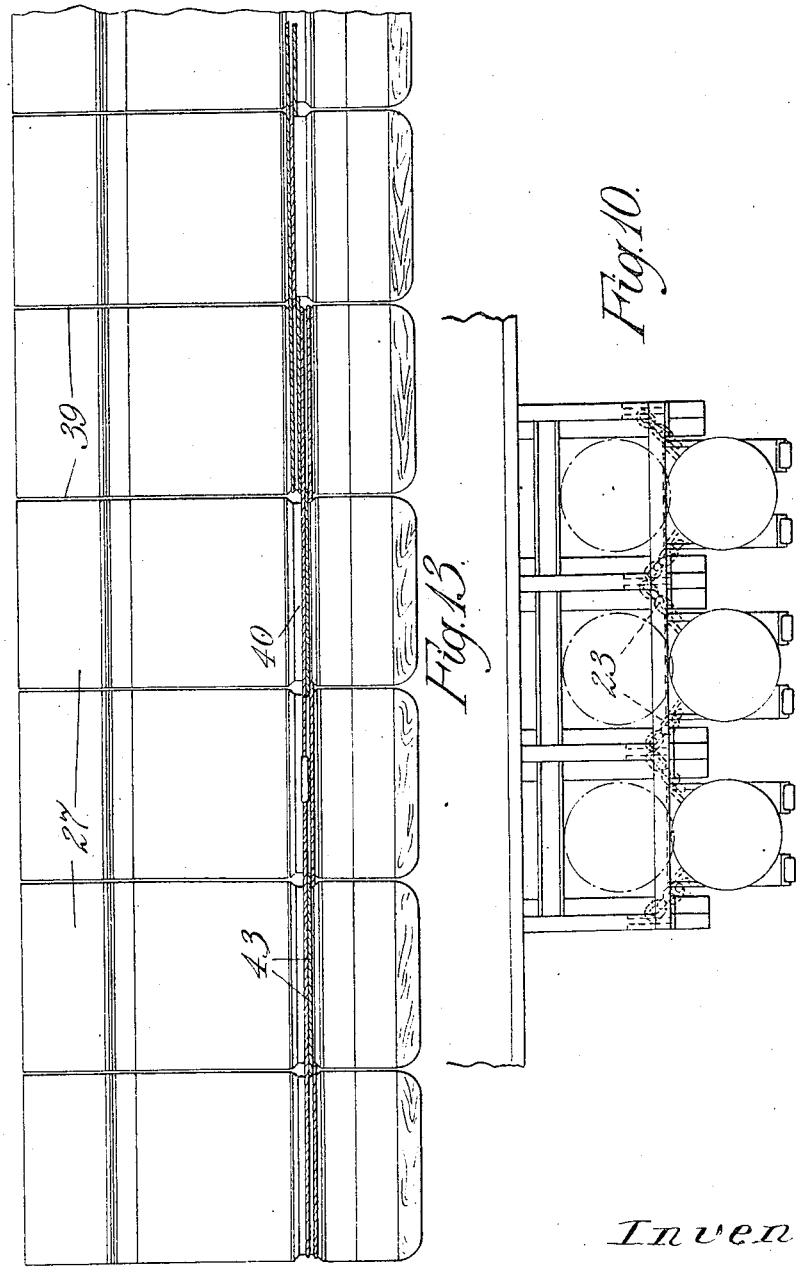
Inventor
A. L. L. Baker

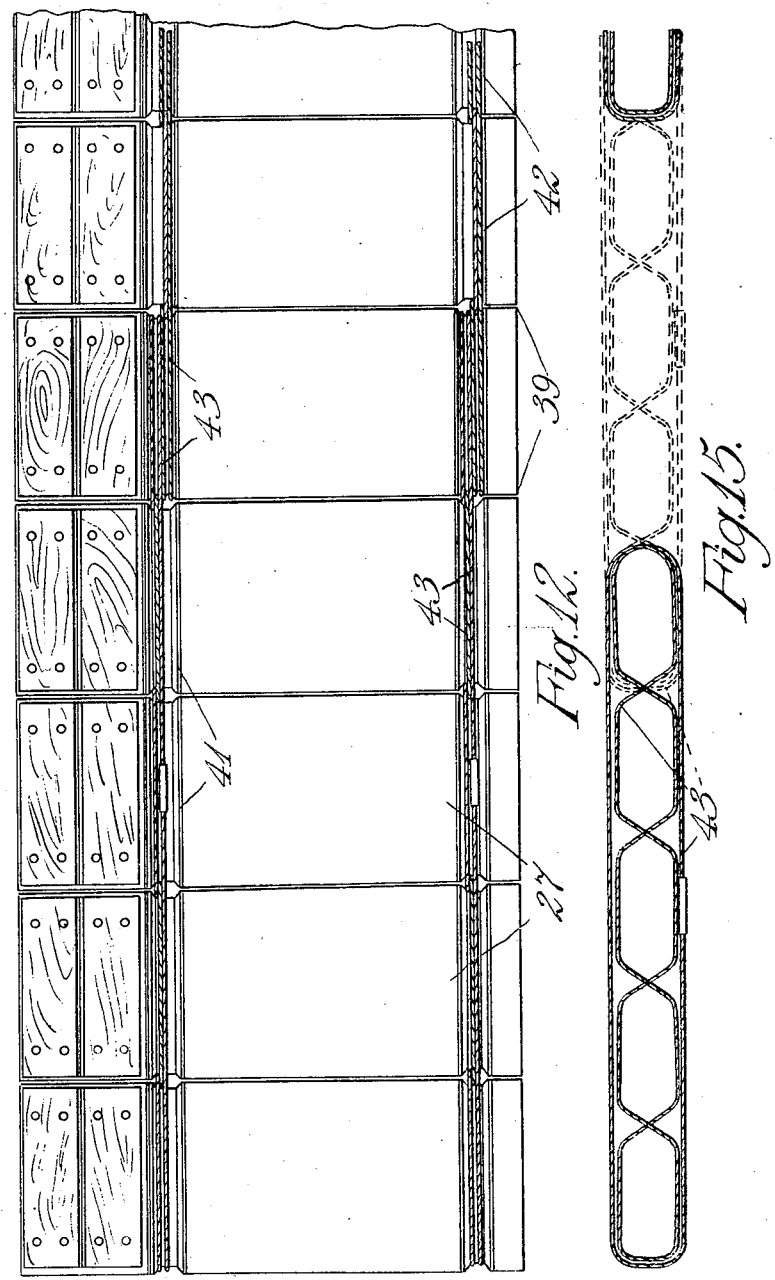

Dec. 25, 1945. A. L. L. BAKER 2,391,612
JETTY, WHARF AND LIKE BERTHING PLACE FOR VESSELS
Filed Nov. 15, 1944 9 Sheets-Sheet 9

Inventor
A. L. L. Baker

Patented Dec. 25, 1945

2,391,612

UNITED STATES PATENT OFFICE 2,391,612

JETTY, WHARF, AND LIKE BERTHING PLACE FOR VESSELS

Arthur Lemprière Lancey Baker, Sevenoaks, England

Application November 15, 1944, Serial No. 563,611
In Great Britain February 1, 1943

4 Claims. (Cl. 61—48)

This invention relates to jetties, wharves, pontoons and the like berthing places for vessels, and has for its object to provide a construction of berthing place for vessels furnished with fenders, suspended in such manner that they may be displaced in an inward and upward direction by the pressure exerted against them of a vessel in berthing and thus oppose a progressively increasing resistance to such displacement so that shocks to vessels arising in berthing may be minimised.

According to the invention, the suspension of the fenders is effected by chains, cables or other flexible or articulated elements of any convenient form.

In certain cases the fender elements may be suspended by connections of this character secured adjacent to the top of the element only.

In other cases they are suspended by such connections at a position adjacent to the top and adjacent to the bottom of the element and optionally at the other convenient points in the length thereof.

Preferably, in accordance with the invention, the means for suspending the fender elements are arranged to permit not only motion thereof in a direction normal to the front or side of the jetty or wharf, but also laterally, and to permit further a restricted degree of rotational motion of the elements.

Thus, in accordance with the invention, each of the fender elements may be suspended by four chains or equivalent members, two of such members being connected with the fender element adjacent to its upper end and two connected with the element adjacent to its lower end.

The points of the suspension of the chains or their equivalents connected with the upper end of each of the fender elements or their equivalents from fixed members associated with the jetty and the points of suspension of the chains or their equivalents adjacent to the lower extremity of the fender element will normally be so positioned with respect to the centre of gravity of the element that in its motion towards the jetty it will remain substantially vertical, the point of connection of the chains or their equivalents with the element moving in an arcuate path or generally radially about their points of suspension.

To this end the point of suspension of the chains or their equivalents which are connected with fixed members forming part of the jetty structure or secured to the jetty structure may be positioned slightly behind the inner side of the elements and the point of suspension of the chains or equivalent members connected with the fender element adjacent to its lower extremity, or it may be positioned a corresponding distance in an outward direction from the jetty.

Motion of the fender elements towards the jetty and upwards will cause the elements to be raised and the increase in the effective weight of the elements as the result of the diminishing displacement of water will consequently operate to an increasing extent in opposition to such motion.

In order that the rate at which resistance increases with displacement may be varied, suitably shaped surfaces may be provided against which the chains or their equivalent will bear when the fender element is displaced.

As will be appreciated, the jetty must be formed or provided for securing the elements in position with means of a character adapted to permit them to move in an inward and upward direction in taking up the pressure set up by the vessel in berthing.

For instance, in accordance with the invention, the jetty structure may be provided with beams extending outward and furnished with means for engaging the chains or equivalent elements.

Thus, where the elements are secured by chains or the like at points adjacent to their upper and lower extremities, an upper and lower set of beams may be provided and between the beams the fender elements will be located so that they may be displaced a greater or less extent into the space between the beams in any direction, and are capable of a limited degree of rotational motion.

The fender elements may be cylindrical or prismatic or of any other suitable form and of a length or height determined by the rise and fall of the tide and by the height of free board of the vessels for the use of which the wharves or jetties are designed.

Where the length or height thereof is greater than their diameter, as will be usual, they will be suspended with their major axes approximately vertical or otherwise extending upward and downward. In some cases it may be of advantage to vary their section or form throughout their length to suit the flairs of vessels, or to satisfy other requirements.

Fender elements in accordance with the invention may be applied to existing jetties, pontoons or like structures, thus facilitating berthing in rough water and reducing the liability of damage to such structures or to the vessels using them and enabling them to be used in berthing larger vessels than those for which they were originally designed, as for instance by providing adequate lateral resistance in connection with a light structure necessitated by a sea bed of low supporting power.

If necessary a floating boom or floating booms may be associated with the fender elements, but the provision of such booms is not essential.

A system of four fenders each weighing 20 tons and arranged so that they may be lifted 30 inches as the result of their displacement, will enable a vessel of 15,000 to 20,000 tons to be berthed at a berthing speed of 1 foot per second without undue shock, the shock absorbing value of the fender elements being in such case 2,400 ton/inches.

Several constructions in accordance with the invention will be described by way of example with reference to the accompanying drawings, in which:

Figure 2 is a plan view,

Figure 3 is a view of a detail of a jetty furnished with shock absorbing fenders in accordance with the invention, Figure 4 is a front elevation, Figure 5 is a side sectional elevation, Figure 6 is a section in plan, and Figure 7 is a part sectional plan of the invention as applied to a pier or dolphin.

Figure 11:
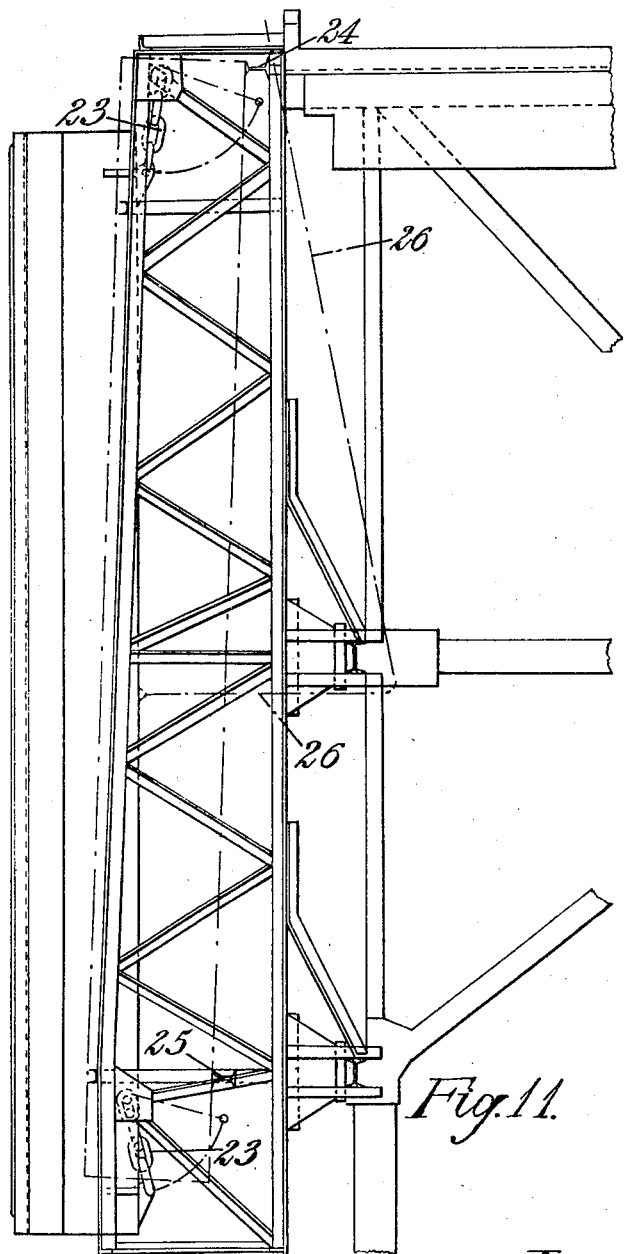
Figure 14:
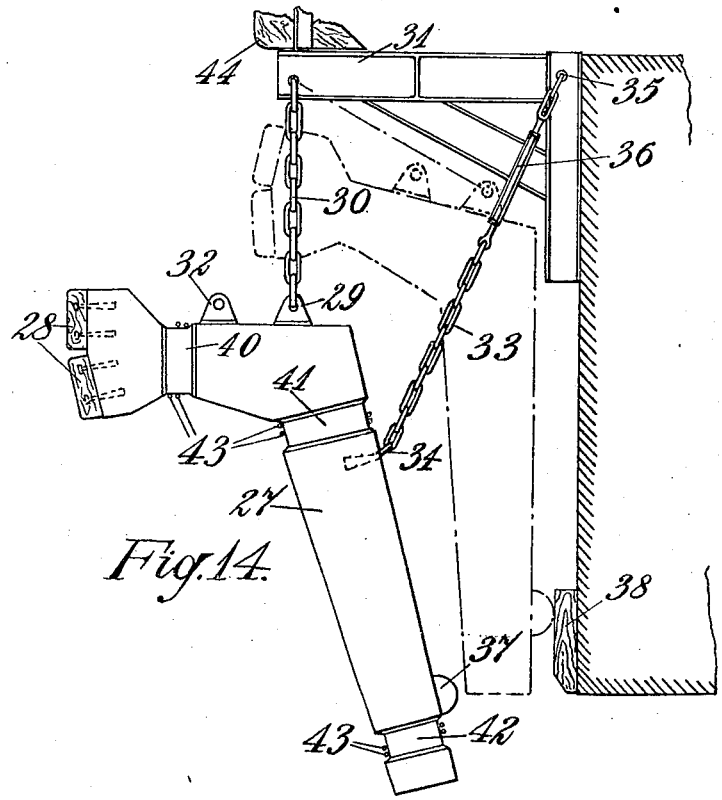
Figure 16:
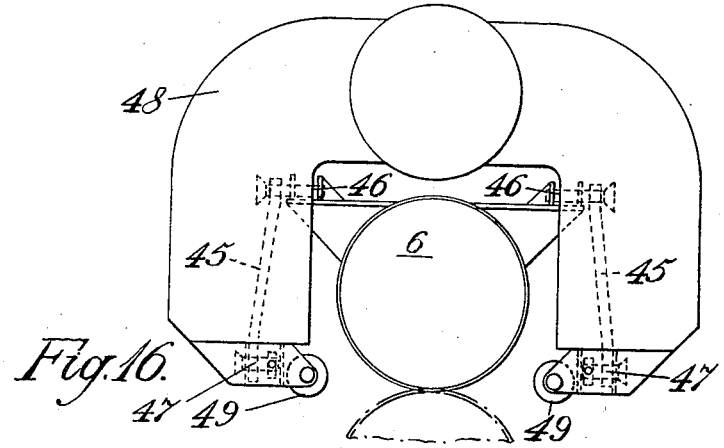

Figure 8 is a diagrammatic plan view of a pier embodying fenders in accordance with the invention, Figure 9 being a view in elevation on a larger scale showing a plurality of such fenders in association with means for supporting them, Figure 10 being a corresponding plan view, and Figure 11 a view in side elevation of the assembly as shown in Figure 9, Figure 12 is a view in elevation, Figure 13 a plan view illustrating the invention as applied to a pontoon and comprising a plurality of fender elements suspended as shown in the cross-section of the construction in Figure 14, Figure 15 being a diagrammatic view in plan showing the inter-connection of the several fender elements, and Figure 16 is a fragmentary view in plan illustrating an alternative means of suspending the fenders.

Figure 1:
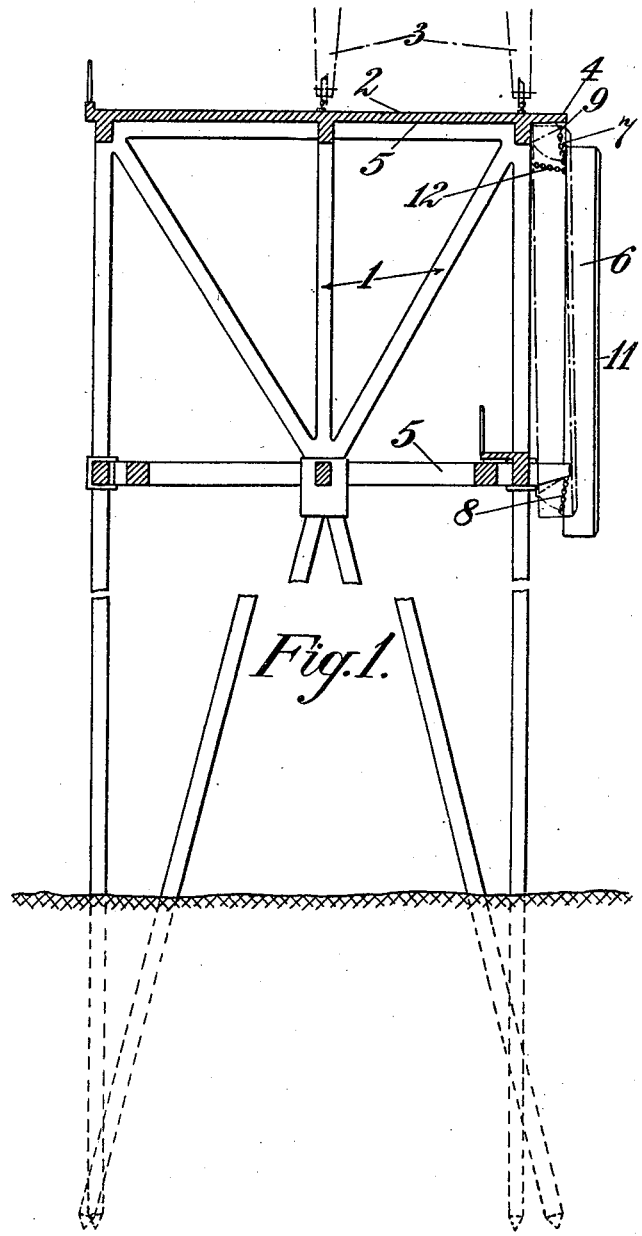
Figure 1 is a view in end elevation.

Referring to Figures 1, 2 and 3, 1 is a braced framework or pile trestle construction forming a jetty and provided with a platform 2 which is shown furnished with a crane track 3.

Between extensions 4 provided on each member 5 of the framework is arranged a fender 6 suspended by two pairs of chains 7 and 8, the chains being connected with brackets such as 9 with the structure and by brackets 10 with the fender in such manner that the centre lines of the top and bottom chains intersect at a point on a vertical through the centre of gravity of the fender.

When the fenders are displaced in berthing, as will be seen from Figure 1, they will be moved in an inward direction and will be caused to rise and they may be caused to assume the position indicated in dotted line in this figure.

Each of the fenders will normally be furnished with rubbing strips 11 and further each of the fenders may be and is shown connected with the structure by a check chain 12.

Referring to Figures 4 to 7, which illustrate in cross-section a mass concrete pier embodying the invention, 13 are frame members secured to the front of the pier the form of which can be seen from Figures 4 and 5, and from the two half plan views in Figures 6 and 7, the lower part of each of which is a plan view on a plane indicated by the line A—A of Figure 4, and the upper part a plan view on a plane indicated by the line B—B of Figure 4.

Between these frame members there are arranged fenders formed of reinforced concrete suspended by pairs of chains 14, 14a, connected with adjustable bolts 15, 15a the points of connection between the chains and the fenders being arranged so that at their lowermost positions the fenders will be substantially vertical.

With this construction there is provided a check chain 16 connected with a screw 17.

The fenders are furnished with timber rubbing strips 18 and on the frame members there are provided timber guides 19.

Figure 8 illustrates a jetty comprising features in accordance with the invention and at each end of the platform 20 of the jetty there is a dolphin 21 which may be of the character claimed in British Specification No. 507,774.

With the jetty there are associated a plurality of frames, one of which is illustrated in Figure 9.

Between the uprights of these frames there are arranged fenders 22 in the form of steel tubes suspended by chains in the manner generally above described with reference to Figure 7.

These chains are indicated by the reference 23 in Figures 9 and 10 and they are adjusted so that normally the fenders will hang vertically so that each may be displaced into the extreme position indicated in chain dotted line.

With the frames are associated stop guides 24, 25, adapted to limit the degree of displacement of the fenders and with the fenders there may be associated chains 26 adapted to pull the fenders back in rough weather, such chains being arranged to be operated from the level of the deck of the jetty by screw jack.

Figure 12 is a view in front elevation of a portion furnished with a plurality of fenders 27 shown in plan in Figure 13. These fenders are of the form shown in Figure 14, that is to say, each of them is a generally L shaped member 27, one limb of which is furnished with rubbing strips or pads 28 and with an eye 29 by which it may be suspended by a chain 30 from the cantilever 31, a second eye 32 being provided to enable the fender to be lowered into position initially and raised for inspection or repair.

To the other limb there is secured a check chain 33 engaging an eye 34 in the fender at one end and connected with a member 35 at the other end, to enable the fenders if necessary to be drawn up and held against the pontoon in rough weather or in towing.

In this chain there is provided a turnbuckle 36.

On the lower end of the limb of the fender there is provided a curved metal element 37 adapted, when the fender is displaced fully inward, to contact with the rubbing strip 38.

As will be seen from Figures 12 and 13 a plurality of such fenders are arranged closely adjacent one to the other and between each of them is arranged a bitumen jointing strip 39.

On the fenders there are provided collars or guides 40, 41, 42 of generally similar form and in these guides there are engaged, as shown in Figure 15, cables 43, each of such cables being taken about the fenders in the manner shown in the drawings so that five adjacent fenders are tied together by the cables and each of the cables in addition is taken about a fender of an adjacent group of five. As an alternative any other appropriate means may be employed for securing an articulating connection between the fenders.

The connection of the fenders in this manner causes the movement of one to effect a displacement of the fenders adjacent to it, so that the whole assembly has the effect of a flexible wall.

On the cantilever element 31 there is arranged a fixed timber fender 44 in a position so that it will line up with the rubbing strips on the suspended fenders when the suspension chain forms an angle of 60° with the vertical, that is to say, when the fender has been brought into the position shown in chain-dotted line.

Referring to Figure 16, which is a fragmentary view in plan illustrating an alternative means of suspending the fenders such as shown at 6 in Figures 1 and 2 as applied to a pier or the like of tubular construction the suspension means is constituted by links 45 instead of chains and each of such links is secured to a pivot 46 on the fender and to a pivot 47 on a cantilever element 48, by which the fender is suspended.

In this construction on the end of the cantilever elements which are in the form of tubes, there are provided rollers 49 which will function as guides for the fenders in entering the spaces between the cantilever elements.

I claim:

1. A berthing place having at least one side against which vessels may be berthed, comprising a plurality of rigid fender elements, articulated means suspending each of the fender elements from the berthing place so that the fender elements may be moved by the pressure exerted against them by a vessel in berthing in an inward and simultaneously in an upward direction in opposition to the action of gravity.

2. A berthing place having at least one side against which vessels may be berthed, comprising a plurality of rigid fender elements, chains suspending each of the fender elements from the berthing place in such manner that the fender elements may be moved by the pressure exerted against them by a vessel in berthing in an inward and simultaneously in an upward direction in opposition to the action of gravity.

3. A berthing place having at least one side against which vessels may be berthed, comprising a plurality of rigid fender elements, four chains suspending each of the fender elements from the berthing place so that the fender elements may be moved by the pressure exerted against them by a vessel in berthing in opposition to the action of gravity, two of such chains being connected with each of the fender elements adjacent to its upper end, and two connected with each of the fender elements adjacent to its lower end.

4. A berthing place having at least one side against which vessels may be berthed, comprising a plurality of rigid fender elements, four chains suspending each of the fender elements from the berthing place so that the fender elements may be moved by the pressure exerted against them by a vessel in berthing in opposition to the action of gravity, two of such chains being connected with each of the fender elements adjacent to its upper end, and two connected with each fender element adjacent to its lower end, the points of suspension of the chains adjacent to the lower extremtiy of the fender element being so positioned with respect to the centre of gravity of the element that in its motion towards the jetty it will remain substantially vertical.

ARTHUR LEMPRIÈRE
LANCEY BAKER.